G. GUNDERSON.
HARROW.
APPLICATION FILED JULY 12, 1916.
1,210,162.
Patented Dec. 26, 1916.
3 SHEETS—SHEET 1.
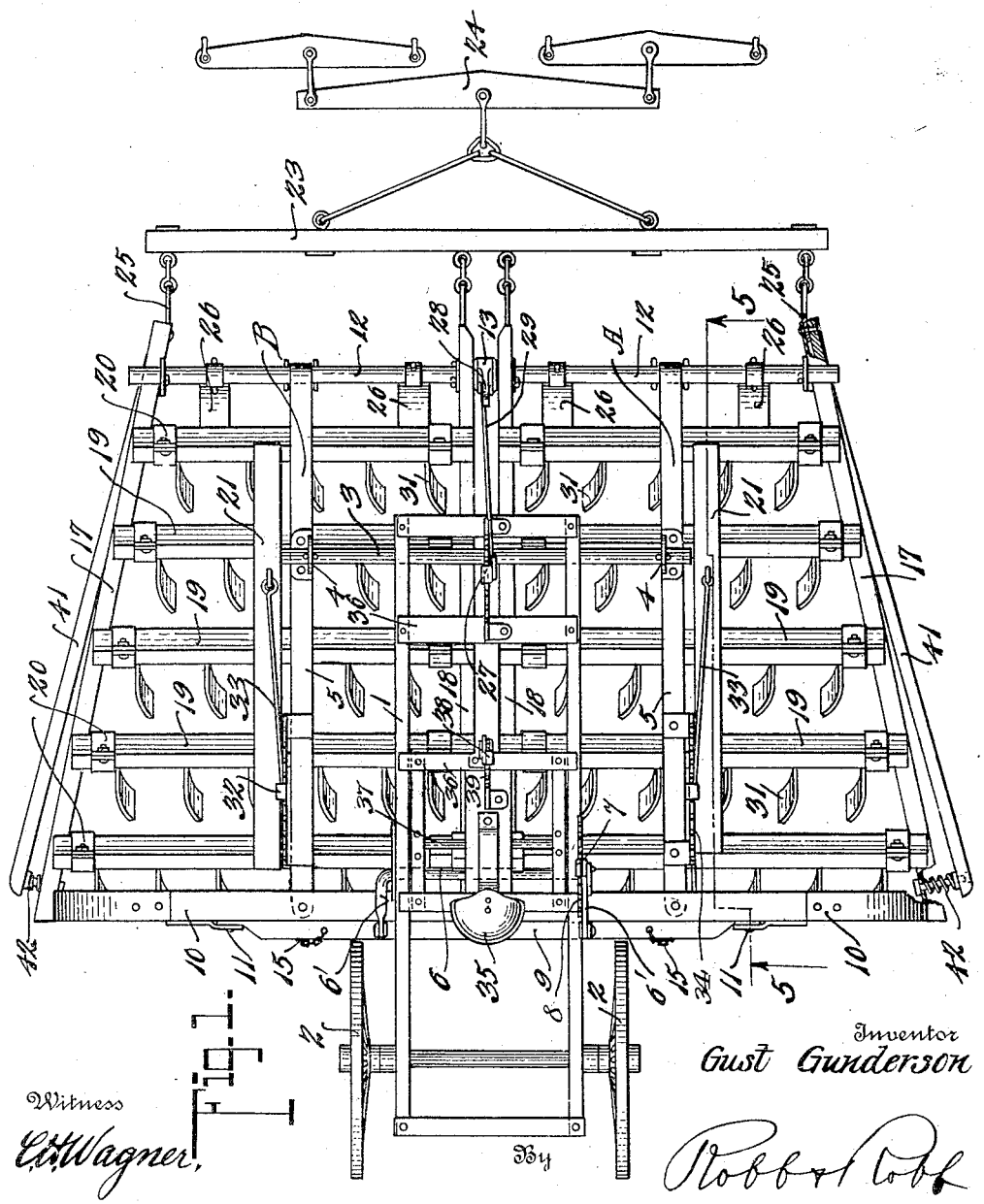
Witness
E.H. Wagner
Inventor
Gust Gunderson
By Robert Cobb
Attorney

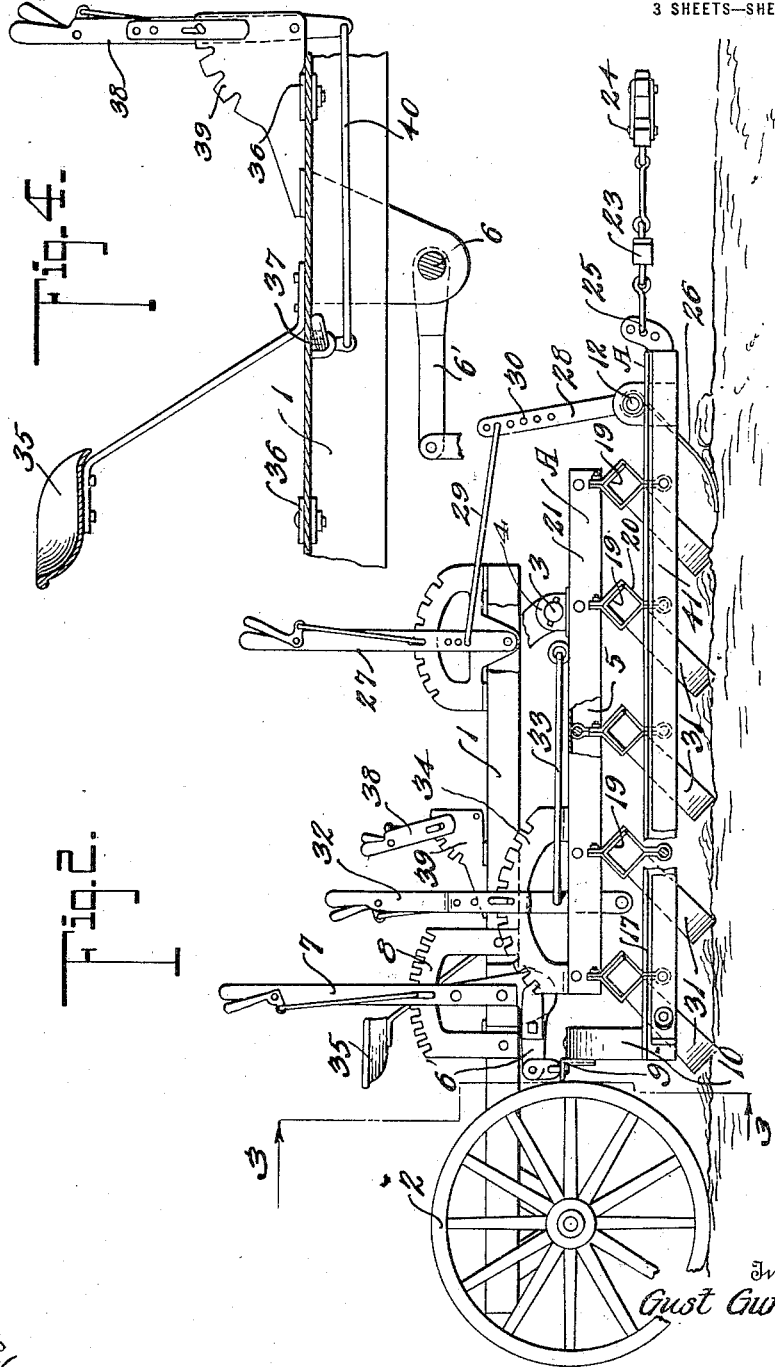

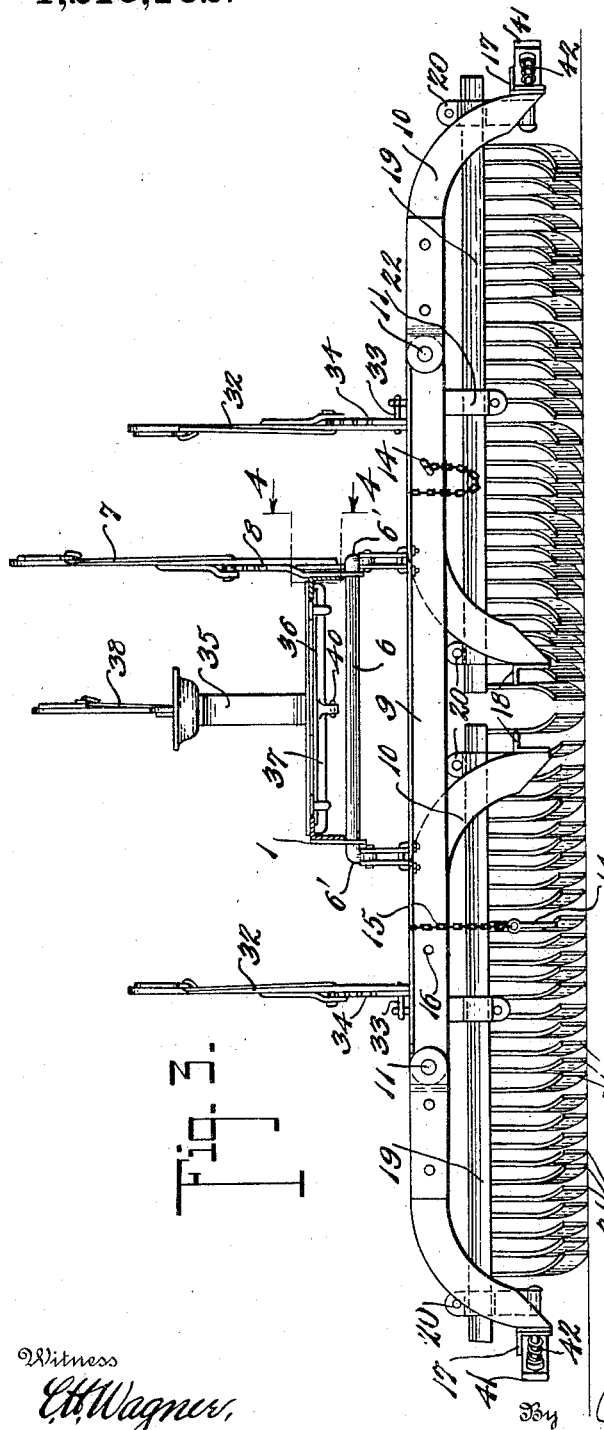

UNITED STATES PATENT OFFICE.

GUST GUNDERSON, OF MOUNTAIN HOME, IDAHO.

HARROW.

1,210,162.  Specification of Letters Patent.  Patented Dec. 26, 1916.

Application filed July 12, 1916. Serial No. 108,923.

*To all whom it may concern:*

Be it known that I, GUST GUNDERSON, a citizen of the United States, residing at Mountain Home, in the county of Elmore and State of Idaho, have invented certain new and useful Improvements in Harrows, of which the following is a specification.

The present invention relates to improvements in agricultural implements known generally as riding harrows.

The primary object in view is to provide a machine of this type permitting of a wide range of adjustment to accommodate for varying conditions of the soil worked upon, such adjustment being designed to produce the greatest effectiveness with respect both to pulverization and leveling of the soil.

To this end the implement consists of a wheeled frame and one or more toothed harrow sections swingingly suspended from the frame for bodily adjustment as a unit to vary the depth of cutting action of the earth working members of said sections and means for independently adjusting the angularity of the toothed elements of each of said sections.

It is further comprehended to provide means for rendering the harrow sections relatively flexible or rigid in relation to their supporting means so as to more or less control the leveling action of the harrow in accordance with the surface conditions of the earth operated upon.

Still another object is to provide for shifting of the position of the operator on the supporting frame so as to effect a proper balancing of the weight, and incidentally affect the working action of the harrow auxiliary to the other adjusting instrumentalities aforesaid.

These and such other objects as may hereinafter appear are attained by the novel construction, combination, and arrangement of parts to be hereinafter specifically described and claimed.

Reference will now be had to the accompanying drawings forming a part of this specification, wherein:

Figure 1 is a top plan view of an apparatus constructed in accordance with my invention. Fig. 2 is a side elevation thereof. Fig. 3 is a sectional view on the line 3—3 of Fig. 2, showing in rear elevation the details of the connections for the harrow sections. Fig. 4 is a sectional view taken on the plane indicated by the line 4—4 of Fig. 3; and Fig. 5 is a longitudinal sectional view on the line 5—5 of Fig. 1.

Throughout the following detailed description, and on the several figures of the drawings, similar parts are referred to by like reference characters.

Referring to the drawings, and specifically describing this apparatus, 1 designates the main supporting frame which is of rectangular formation, and the members of which consist preferably of angle iron, said frame at its rear extremity being supported by the ground wheels 2. At the forward extremity of the frame is provided a transverse supporting rod 3, to the outer extremity of which each of the harrow sections A, B is connected as by means of an apertured ear 4 carried by the respective central frame members 5 of said harrow sections. This connection of the harrow sections to the rod is a pivotal one and permits of the adjustment of the harrow sections by means hereinafter more fully set forth to more or less control the cutting action of the earth working instrumentalities of said sections. The main frame 1 carries at an intermediate point a rock shaft 6 which is designed to be operated or rotated by means of the lever 7 attached to one end thereof. This lever is adjusted in the usual manner by the operator and held in adjusted position by the notched segment 8 on the frame 1. At each end the shaft 6 is provided with a rearwardly extending arm 6', which arms are pivotally connected to a transverse connecting bar 9 which is designed to connect the harrow sections A, B together at their rear extremities. Each harrow section referred to is provided with a rear frame member 10 pivotally connected at an intermediate point as indicated at 11 to an extremity of this connecting bar 9 just mentioned. It will be obvious from this description that the rear portions of the harrow sections may be raised or lowered simultaneously upon shifting of the lever 7 forwardly or rearwardly, this adjustment carrying the harrow sections as a unit.

The forward extremities of the harrow sections A, B are also connected together by the transversely alined rod sections 12 which are connected together at their adjacent inner ends by a flexible coupling 13 to which said ends are fixedly secured. In this manner each of the harrow sections has an independent action and may operate in conformity with the surface over which the apparatus is operated. Where, however, this surface is not level and it is designed to produce a leveling action, the sections may be rendered relatively rigid by means of the pins 14, one of these being provided for each section and having a flexible connection 15 with the connecting bar 9, said bar and the rear frame bars 10 of the harrow sections each having apertures 16 to receive, when alined or registering, the pins 14 just mentioned. Owing to the location of the apertures 16 and the establishment of the connection by the pins 14 at a spaced point with relation to the flexible or pivot connection 11, the rear ends of the harrow sections are rendered relatively rigid. This means of connection is particularly advantageous also when moving the apparatus to and from the field or place of operation.

Reverting to the specific construction of the harrow sections, each is provided with an outer lateral frame bar 17, said bars converging toward the forward portion of the apparatus. Inner side bars or frame members 18 are provided and to these bars 17 and 18 the transverse tooth carrying bars 19 are pivotally connected, as by means of the clamping members or clips 20. Said tooth carrying bars of the respective harrow sections are all connected by an intermediate connecting bar 21, this connection being pivotal and through the respective clamping members or clips 22, shown most clearly in Fig. 5. To the forward extremities of the harrow frame members 17 and 18 is attached the draft bar 23 provided as usual with the double tree and single tree draft means 24. Under ordinary conditions the adjustable connection of the draft bar 23 to the harrow frame bars 17 and 18 as indicated at 25 controls the contact of the earth working members with the surface operated upon. This forward end of the apparatus, however, carrying the weight of the harrow sections, is supported preferably by means of the surface engaging blades or teeth 26 which are fixed to the rod sections 12 constituting the forward connecting means for the harrow sections. This forward connecting member is capable of being rotated so as to raise or lower the forward portion of the apparatus by means of the lever 27 carried on the forward extremity of the supporting frame 1 and operatively connected to the vertical arm 28 fixed to the flexible coupling 13, as by means of the connecting link 29. The arm 28 is provided with a plurality of openings 30 so as to permit of adjustment of the connecting link 29 to thereby control the leverage, and movement of the lever 27 forwardly or rearwardly will rotate the blades 26 and raise or lower the forward portion of the apparatus as hereinbefore described. In addition to this general adjustment each of the transverse harrow bars 19 to which are fixedly connected the teeth or blades 31 is capable of being adjusted so as to regulate the angularity of these teeth and thereby the cutting action. This adjustment is accomplished by providing each of the sections with an adjusting lever 32 supported on the intermediate frame bar 5 and connected to the adjacent connecting bar 21 by means of a link or rod 33. The lever 32 is held at adjusted positions by means of the notched segment 34 so that it will be obvious upon movement of the lever 32 forward or rearwardly the connecting bar 21 will be shifted in a similar manner and the respective tooth carrying bars swung on their pivots to provide for adjustment of their teeth. These teeth are preferably flat curved blades with their edges engaging with the ground as distinguished from the flat surface engaging arrangement of the members 26.

The frame 1 of this machine is provided with an operator's seat 35 which at its lower end is connected to a sliding frame 36, the extremities of the transverse members of the sliding frame engaging with the side members of the main frame 1. This seat and its frame are capable of being shifted forwardly or rearwardly and in this manner the weight of the operator is carried in corresponding directions as may be desired for producing a proper balance of the apparatus or for advantageously increasing or decreasing the cutting action of the harrow members. This is particularly desirable where the earth worked upon is cloddy or hard. The movement of the seat in this manner also enables the operator to reach the several adjusting levers whenever they require adjustment by shifting his position on the frame 1. It is desirable to provide for holding the seat at its adjusted position and this is accomplished by a transversely arranged rod 37 connected to the side members of the seat frame, the extremities of this rod being bent at an angle to engage beneath the side members of the frame 1 as shown in Fig. 4 of the drawings. The rod 37 is adjustable by means of the lever 38 secured to the seat frame at its forward portion and held by the notched segment 39, the lower extremity of the lever being connected to the rod 37 by the connecting member 40. When the seat is moved to its proper position the lever 38 is pulled rearwardly which causes a frictional contact of the bent extremities of the rod 39 with the side members of the frame 1 holding the seat in position at this location.

The apparatus hereinbefore described may be provided with any desired number of harrow sections and they may be arranged in relation to each other in greater or less spaced relation to each other than is disclosed by the accompanying drawings. Where the apparatus is particularly designed for work in orchards I preferably provide the outer lateral frame members of the harrow sections with fenders 41, the rearward ends of which are normally held in spaced relation to the respective side members by the springs 42. The fenders are thus compressible and are particularly designed to prevent injury to the trees between which the apparatus may be operated.

Having thus described my invention what I claim as new is:

1. In a harrow of the class described, the combination of a wheeled frame, harrow sections suspended from said frame, forward connecting means for said sections, surface engaging elements secured to said connecting means, and means on the wheeled frame to operate the connecting means for raising or lowering the forward portions of the sections by the surface engaging elements.

2. In a harrow of the class described, the combination of a wheeled frame, harrow sections suspended from said frame, forward connecting means for said sections comprising alined rod sections, a flexible coupling to which the contiguous ends of the rod sections are fixed, and adjusting means connected to the coupling for actuating the rod sections to raise or lower the forward portion of the harrow sections.

3. In a harrow of the class described, the combination of a wheeled frame, harrow sections suspended from said frame, forward connecting means for said sections, surface engaging elements secured to said connecting means, means on the wheeled frame to operate the connecting means for raising or lowering the forward portions of the sections by the surface engaging elements, and means for adjusting the rear portion of the harrow sections upwardly or downwardly.

4. In a harrow of the class described, the combination of a frame, harrow sections, a supporting member on the frame to which the harrow sections are independently connected at their forward portions, a connecting member suspended from the frame to which each harrow section is shiftably connected at its rear portion, and means for rendering the sections rigid with respect to the connecting member.

5. In a harrow of the class described, the combination of a frame, harrow sections, a supporting member on the frame to which the harrow sections are independently connected at their forward portions, a connecting member suspended from the frame to which each harrow section is shiftably connected at its rear portion, means for rendering the sections rigid with respect to the connecting member, and means for adjusting the connecting member to raise or lower the harrow sections.

6. In a harrow of the class described, the combination of a frame, harrow sections, a supporting member on the frame to which the harrow sections are independently connected at their forward portions, a connecting member connecting said sections together, said sections being pivotally connected thereto to render them flexible, and means supported on the frame for simultaneously raising or lowering the harrow sections through the rear connecting member.

7. In a harrow of the class described, the combination of a frame, harrow sections, a supporting member on the frame to which the harrow sections are independently connected at their forward portions, a connecting member connecting said sections together, said sections being pivotally connected thereto to render them flexible, and means engageable with the last mentioned connecting member and a harrow section at a point spaced from the pivot thereof to render the section relatively rigid.

8. In a harrow of the class described, the combination of a frame, harrow sections connected to said frame, a connecting bar for said sections suspended from the frame and to which each section is flexibly connected, and a pin engageable with the connecting bar and each section for rendering said sections or either one of them rigid.

9. In a harrow of the class described, the combination of a frame, harrow sections connected to said frame, a connecting bar for said sections suspended from the frame and to which each section is flexibly connected, a pin engageable with the connecting bar and each section for rendering said sections or either one of them rigid, a flexible connection at the forward end of said sections, a rock shaft to which the connecting bar aforesaid is operatively connected, and means for operating said rock shaft to raise or lower the harrow sections.

10. In a harrow of the class described, the combination of a main frame, ground wheels at one end thereof, harrow sections suspended at the other end thereof, means intermediate the frame for adjusting said harrow sections, a seat shiftably carried by said frame for movement forwardly or rearwardly to more or less control the action of the harrow sections, and means for locking said seat at adjusted positions.

11. In a harrow of the class described, the combination of a main frame, ground wheels at one end thereof, harrow sections suspended at the other end thereof, adjusting means for said harrow sections, a seat shiftably carried by said frame with respect to said adjusting means and comprising a seat frame slidably engaging the main frame, and means carried by said seat frame engageable with the main frame for holding the former at adjusted positions.

12. In a harrow of the class described, the combination of a main frame, ground wheels at one end thereof, harrow sections suspended at the other end thereof, adjusting means for said harrow sections, a seat shiftably carried by said frame with respect to said adjusting means and comprising a seat frame slidably engaging the main frame, an adjusting lever carried by said seat frame, and a shaft mounted on said seat frame operably connected to the lever, said shaft having its extremities bent to frictionally engage the main frame upon adjustment of the lever aforesaid.

In testimony whereof I affix my signature.

GUST GUNDERSON.

Copies of this patent may be obtained for five cents each, by addressing the "Commissioner of Patents, Washington, D. C."